(12) United States Patent
Pierson et al.

(10) Patent No.: US 6,304,544 B1
(45) Date of Patent: *Oct. 16, 2001

(54) CARD COMPACT DISC, COMPACT DISC INTERFACE SEAT AND METHODS OF USING SAME

(75) Inventors: Gerald A. Pierson; Benjamin J. Everidge; Raymond K. Engelking, all of Orlando, FL (US)

(73) Assignee: Diskxpress US, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/464,059

(22) Filed: Dec. 15, 1999

Related U.S. Application Data

(63) Continuation of application No. 09/292,285, filed on Apr. 15, 1999, now Pat. No. 6,078,557, which is a continuation of application No. 08/856,915, filed on May 15, 1997, now Pat. No. 5,982,736.

(51) Int. Cl.[7] ....................................................... G11B 7/24
(52) U.S. Cl. ............................................ 369/273; 369/286
(58) Field of Search ..................................... 369/273, 272, 369/274, 281, 283, 286, 292, 77.1; 360/2, 135, 137

(56) References Cited

U.S. PATENT DOCUMENTS

| D. 193,785 | 10/1962 | Campbell, Jr. et al. | ............... D26/14 |
| D. 231,470 | 4/1974 | Klepa et al. | ..................... D26/14 B |

(List continued on next page.)

FOREIGN PATENT DOCUMENTS

| 1537/97 | 6/1997 | (CH) . |
| 0526/98 | 3/1998 | (CH) . |

(List continued on next page.)

OTHER PUBLICATIONS iOra Mobile Intranet, eSolutions for Mobile Professionals, [retrieved on Jun. 12, 2000]. Retrieved from the Internet: <http://www.iora.com>.

iOra SoftCD, eSolutions for Mobile Professionals, [retrieved on Jun. 12, 2000]. Retrieved from the Internet: <http://www.iora.com>.

(List continued on next page.)

*Primary Examiner*—David L. Ometz
(74) *Attorney, Agent, or Firm*—Allen, Dyer, Doppelt, Milbrath & Gilchrist, P.A.

(57) ABSTRACT

A trading card optical compact disc and method of using and forming the compact disc are provided which are compatible with a disc reader having a centrally located spindle and a seating ring for supporting and rotating a compact disc positioned thereon. The trading card optical compact disc according to an embodiment of the invention preferably has at least a first plastic rectangular layer having a width of about 2.5 inches and a length of about 3.5 inches and having a pattern of digital data encoded thereon. A second metallic layer is formed on at least portions of the first plastic layer, and a third protective layer is formed on at least the second layer for protecting the metallic layer. An indicia bearing fourth layer is formed on the third layer and has a generally planar upper surface for displaying indicia therefrom. An opening extends through the first, second, third, and fourth layers in a medial portion thereof. A trading card interface seat is preferably integrally formed in at least the first layer for seating the trading card onto a loading tray of a disc reader so as to interface with only portions of the seating ring of the seating ring of the disc reader and to read digital data stored thereon from the trading card optical compact disc.

16 Claims, 3 Drawing Sheets

U.S. PATENT DOCUMENTS

| | | | |
|---|---|---|---|
| D. 394,648 | 5/1998 | Rohde | D14/121 |
| D. 418,502 | 1/2000 | Friday | D14/121 |
| D. 419,151 | 1/2000 | Koedel | D14/121 |
| D. 435,953 | 1/2001 | Mehta et al. | D14/478 |
| 2,293,301 | 8/1942 | Mitchell | 40/340 |
| 2,961,922 | 11/1960 | Schwartz et al. | 353/16 |
| 3,302,520 | 2/1967 | Dimitracopoulos et al. | 353/120 |
| 3,495,839 | 2/1970 | Kelly | 274/39 |
| 3,691,312 | 9/1972 | Petersen | 360/2 |
| 3,839,601 | 10/1974 | Kimura et al. | 179/100.3 |
| 4,014,604 | 3/1977 | Schwartz | 353/120 |
| 4,091,454 | 5/1978 | Kauffmann | 360/135 |
| 4,114,181 | 9/1978 | Itoh | 360/2 |
| 4,486,496 | 12/1984 | Dezawa et al. | 428/328 |
| 4,592,042 | 5/1986 | Lemelson et al. | 369/258 |
| 4,680,460 | 7/1987 | Drexler | 235/488 |
| 4,683,371 | 7/1987 | Drexler | 235/487 |
| 4,745,268 | 5/1988 | Drexler | 235/487 |
| 4,812,633 | 3/1989 | Vogelgesang et al. | 235/487 |
| 4,868,373 | 9/1989 | Opheji et al. | 235/380 |
| 4,904,853 | 2/1990 | Yokokawa | 235/487 |
| 4,916,687 | 4/1990 | Endo | 369/111 |
| 5,043,974 | 8/1991 | Nakagawa | 369/291 |
| 5,045,676 | 9/1991 | Kime | 235/487 |
| 5,059,774 | 10/1991 | Kubo et al. | 235/454 |
| 5,107,099 | 4/1992 | Smith | 235/449 |
| 5,411,259 | 5/1995 | Pearson et al. | 273/93 C |
| 5,417,431 | 5/1995 | Gluck | 273/293 |
| 5,433,035 | 7/1995 | Bauer | 40/124.1 |
| 5,441,278 | 8/1995 | Nalder | 273/296 |
| 5,465,381 | 11/1995 | Schmidt et al. | 395/800 |
| 5,480,156 | 1/1996 | Doederlein et al. | 273/237 |
| 5,579,296 | 11/1996 | Smith et al. | 369/273 |
| 5,652,838 | 7/1997 | Lovett et al. | 395/186 |
| 5,717,682 | 2/1998 | Nomoto | 369/275.4 |
| 5,852,598 * | 12/1998 | Wiest | 369/272 |
| 5,878,434 | 3/1999 | Draper et al. | 707/202 |
| 5,882,555 | 3/1999 | Rohde et al. | 264/1.33 |
| 5,924,096 | 7/1999 | Draper et al. | 707/10 |
| 5,933,826 | 8/1999 | Ferguson | 707/9 |
| 5,950,198 | 9/1999 | Falls et al. | 707/8 |
| 5,960,465 | 9/1999 | Adams | 711/208 |
| 5,965,745 | 9/1999 | Bradford et al. | 711/137 |
| 5,982,736 * | 11/1999 | Pierson | 369/273 |
| 5,991,771 | 11/1999 | Falls et al. | 707/202 |
| 6,016,298 | 1/2000 | Fischer | 369/75.1 |
| 6,078,557 * | 6/2000 | Pierson | 369/273 |

FOREIGN PATENT DOCUMENTS

| | | |
|---|---|---|
| M9503202.9 | 4/1995 | (DE) . |
| M9502679 | 9/1995 | (DE) . |
| 297 08 978 | 8/1997 | (DE) . |
| 297 09 648 | 1/1998 | (DE) . |
| 0 292 720 | 11/1988 | (EP) . |
| 0 230 069 | 7/1989 | (EP) . |
| 0 343 982 | 11/1989 | (EP) . |
| 0 479 339 | 4/1992 | (EP) . |
| 0 479 340 | 4/1992 | (EP) . |
| 0 618 711 | 10/1994 | (EP) . |
| 2 668 277 | 4/1992 | (FR) . |
| 95 5636 | 10/1995 | (FR) . |
| 56 003471 | 1/1981 | (JP) . |
| 04 040586 | 2/1992 | (JP) . |
| 10 138667 | 6/1998 | (JP) . |
| 99/12159 | 3/1999 | (WO) . |

OTHER PUBLICATIONS

Epsilon Techology, [retrieved on Jun. 12, 2000]. Retrieved from the Internet: <http://www.iora.com/epsilon/epsilon.htm>.

Partner Program, [retrieved on Jun. 12, 2000]. Retrieved from the Internet: <http://www.inora.com/partners/partners.htm>.

Mobile Intranet, [retrieved on Jun. 12, 2000]. Retrieved from the Internet: <http://www.iora.com/mobile/mobile.htm>.

iOra Press Release: Shell Mobilizes Health & Safety with iOra, [retrieved on Jun. 12, 2000]. Retrieved from the Internet: <http://www.iora.com/media/pressshell.htm>.

iOra Press Release: iOra Win$ Award for Innovation, [retrieved on Jun. 12, 2000]. Retrieved form the Internet: <http://www.iora.com/media/pressdtismart.htm>.

iOra Press Release: iOra CEO Interviewed on Silicon.com, [retrieved on Jun. 12, 2000]. Retrieved from the Internet: <http://www.iora.com/media/SiliconApril.htm>.

iOra Press Release: SmithKline Beecham outs iOra Mobile Intranet at heart of Intranet Strategy, [retrieved on Jun. 12, 2000]. Retrieved from the Internet: <http:/www.iora.com/media/pressskb.htm>.

iOra Press Release: iOra Announces Mobile Intranet, [retrieved on Jun. 12, 2000]. Retrieved from the Internet: <http://www.iora.com/media/press1.htm>.

iOra Homepage, [retrieved on Jun. 12, 2000]. Retrieved from the Internet: <http://www.iora.com/homepage.htm>.

Contact iOra, [retrieved on Jun. 12, 2000]. Retrieved from the Internet: <http://www.iora.com/contact/contact.htm>.

iOra SoftCD Solutions (mobile uses, training, marketing, reference, E–catalogues), [retrieved on Jun. 12, 2000]. Retrieved from the Internet: <http://www.iora.com/solutions/solutions.htm>.

iOra SoftCD, [retrieved on Jun. 12, 2000]. Retrieved from the Internet: <http://www.iora.com/softcd/softcd.htm>.

Company Board, [retrieved on Jun. 12, 2000]. Retrieved from the Internet: <http://www.iora.com/about/about.board.htm>.

* cited by examiner

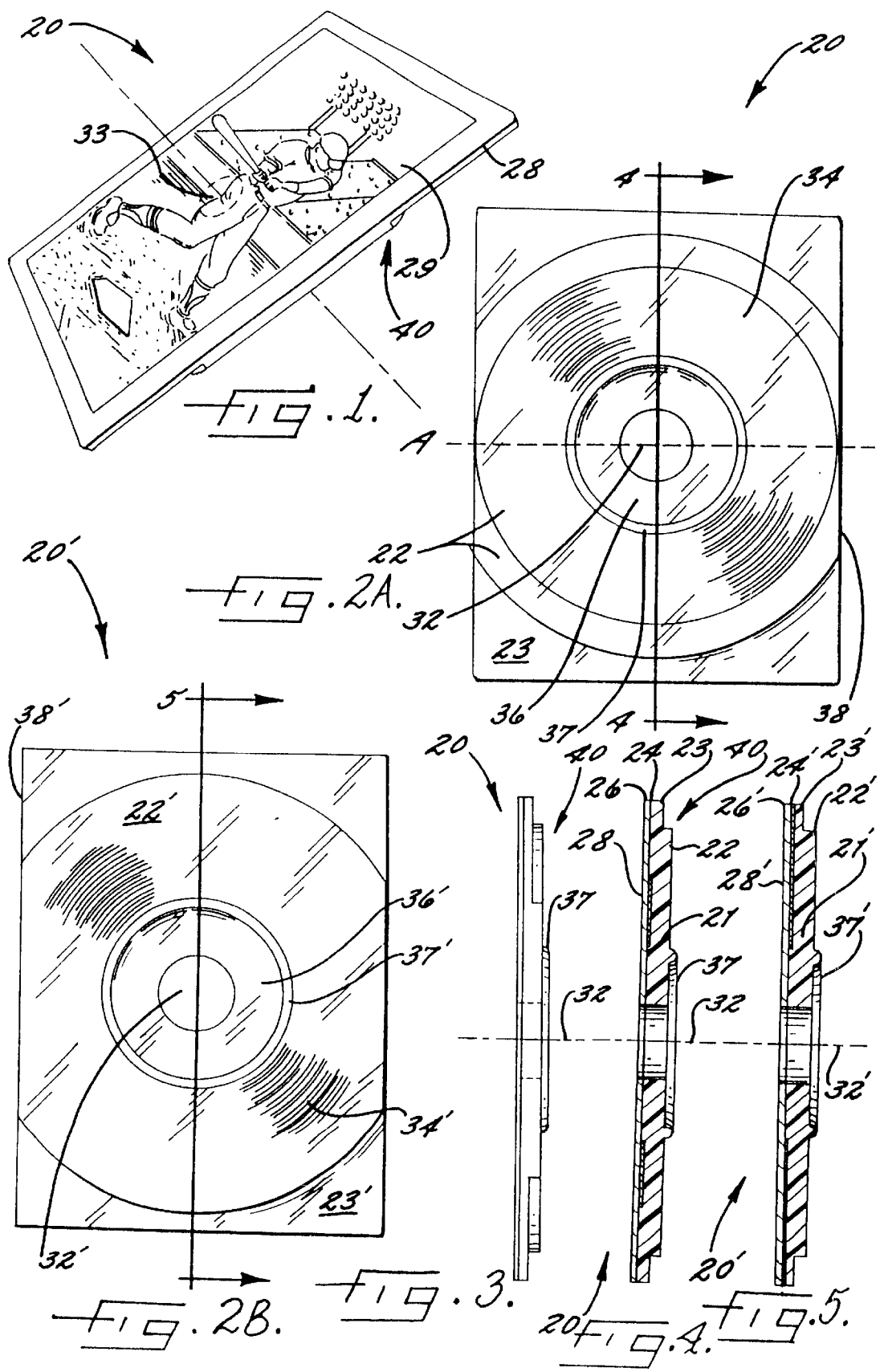

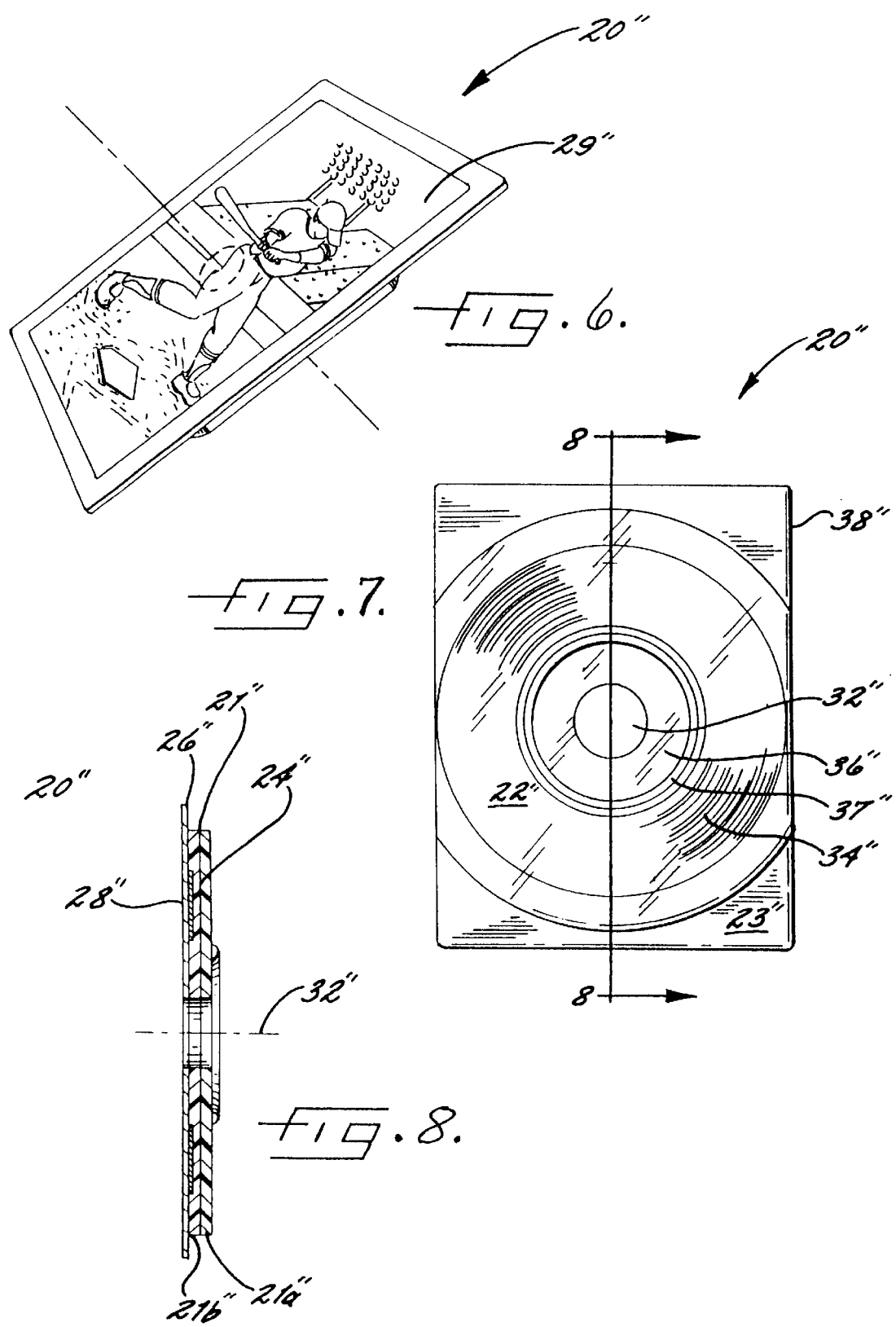

CARD COMPACT DISC, COMPACT DISC INTERFACE SEAT AND METHODS OF USING SAME

This application is a continuation of Ser. No. 09/292,285 filed on Apr. 15, 1999, now U.S. Pat. No. 6,078,557 which is a continuation of Ser. No. 08/856,915 filed May 15, 1997 which is now U.S. Pat. No. 5,982,736 the disclosures of which are hereby incorporated by reference in their entirety.

FIELD OF THE INVENTION

This invention relates to novelty trading items and, more particularly, to novelty trading items for storing and communicating data to enthusiasts, hobbyists, and collectors.

BACKGROUND OF THE INVENTION

Over the years the trading card industry has developed as both a novelty item and a collectors item. As time goes by, the value of many of these trading cards which have printed indicia thereon has increased so that the trading card industry has grown significantly over the years and many trading cards have substantially increased in value. As technology has changed, however, various types of trading cards and methods of storing and communicating data have been developed.

The concept of associating card devices which store and communicate information to a user with indicia or an image thereon has been known for many years. Examples of such devices can be seen in U.S. Pat. No. 3,691,312 by Petersen titled "Tape Recording Apparatus And System Having A Very Thin Cassette," U.S. Pat. No. 4,904,853 by Yokokawa titled Dual-Function Information-Carrying Sheet Device," U.S. Pat. No. 5,411,259 by Pearson et al. titled *Video Sports Game System Using Trading Cards*," and U.S. Pat. No. 5,433,035 by Bauer titled "Talking Entertainment Card." These prior card devices, however, either used older methods of storing and communicating information such as cassettes or used integrated circuit technology. Accordingly, these prior methods can be expensive and complex to manufacture even in large volumes and neither understood nor appreciated the benefits, capabilities, design, or construction of optical digital data storage devices, and more particularly optical compact discs. Only recently has the technology and concepts related to the use of optical digital data storage devices really increased and been accepted in the market so that the relative price of optical digital data storage media has decreased dramatically.

Conventional compact discs, for example, are conventionally fabricated in either 80 millimeter ("mm") or 120 mm sizes and are formed of generally rigid plastic discs. As understood by those skilled in the art, the discs are often formed by the use of a mold-based replication system using injection molding techniques. Each compact disc includes a series of either circular or spiral data tracks which are illuminated and read by a source of coherent light such as a laser. In producing these compact discs, data is optically mastered from data files and positive copies of the data are made. Die stampers are produced from electroplated shims, and discs are molded from the negative images on the die stampers. The discs are then individually metalized, and a lacquer coating is applied to each disc. The layer of rigid plastic positioned between each data track and the source of coherent light provides structural rigidity, protects the data tracks, and also functions as a single integral lens element to refract and focus the coherent light beam onto a selected data track. A disc label is also printed, and the disc inserted into a clam shell or other package for shipment to customers.

Recently, however, other thin film digital data storage medium and methods of manufacturing digital data storage media have been developed including for use with trading cards. An example of this thin film digital data storage medium and related methods can be seen in U.S. Pat. No. 5,579,296 by Smith et al. titled "Optically Readable Thin Film Digital Data Storage Medium." These recently developed trading cards, however, require extensive and new manufacturing investments, require a special adaptor to make the trading cards compatible with compact disc playing systems, and can be inhibited by marketing and manufacturing constraints, including the additional special adaptor, which can make this recently developed technology less commercially feasible.

SUMMARY OF THE INVENTION

With the foregoing in mind, the present invention provides a trading card optical compact disc and methods of using a compact disc which are readily compatible with existing disc readers and relatively inexpensive to manufacture. The present invention also advantageously provides a trading card optical compact disc and method of forming a trading card that stores and communicates trading card information to a user of a disc reader in a manner that is relatively easy to manufacture in conjunction with known optical compact disc manufacturing techniques and thereby does not require extensive additional molding and tooling costs. The present invention further provides a trading card optical compact disc which does not require a separate special adapter for compatibility with existing disc readers.

More particularly, a trading card optical compact disc and method of using and forming the compact disc are provided which are compatible with a disc reader having a centrally located spindle and a seating ring for supporting and rotating a compact disc positioned thereon. The trading card optical compact disc according to a first embodiment of the present invention preferably has at least a first plastic rectangular layer having a width of about 2.5 inches and a length of about 3.5 inches and having a pattern of digital data encoded thereon. A second metallic layer if formed on at least portions of the first plastic layer, and a third protective layer is formed on at least the second layer for protecting the metallic layer. An indicia bearing fourth layer is formed on the third layer and has a generally planar upper surface for displaying indicia therefrom. An opening extends through the first, second, third, and fourth layers in a medial portion thereof. Trading card interface seating means is preferably integrally formed in at least the first layer for seating the trading card onto a loading tray of a disc reader so as to interface with only portions of the seating ring and not other portions of the seating ring of the disc reader and to read digital data stored thereon from the trading card optical compact disc.

According to the present invention, the trading card seating means is preferably provided by the at least a first plastic layer which has a major elevational portion having a first predetermined height and a minor elevational portion having a second predetermined height. The major elevational portion has the encoded digital data thereon, and the minor elevational portion is preferably devoid of the encoded digital data. For alignment, balancing, and compatibility purposes, the major elevational portion is advantageously formed in a medial portion of the trading card and has first and second pairs of spaced-apart outer side peripheries defining outer boundaries of the major elevational portion. Each of the first pair of space-apart outer side peripheries arcuately extend between each of the second pair of space-apart outer side peripheries. Each of the second pair of space-apart outer side peripheries extend generally linearly between each of the first pair of spaced-apart outer peripheries. Each of the arcuately-extending first pair of spaced-apart outer side peripheries of the major elevational portion are centered about an axis extending through the medial opening and generally perpendicular to the linearly-extending second pair of space-apart outer side peripheries. The encoded digital data of the major elevational portion of the first layer is formed within a circular data zone and preferably does not cover, i.e., less than, the entire surface area of the major elevational portion of the first layer. The circular data zone has a first inner circular periphery having a radius of at least 0.6 inches and a second outer circular periphery having a radius of less than 1.25 inches. The circular data zone is preferably capable of storing between 60–70 Megabytes of information or data therein in some compact disc formats, e.g., audio or CD-ROM, or 450–500 Megabytes in other compact disc formats, e.g., digital video. A first non-metallic zone surrounds and extends outwardly a predetermined distance from the medial opening, and a second non-metallic zone extends inwardly from the rectangular outer perimeter of the trading card optical compact disc a predetermined distance.

By the provision of the trading card interface seating means, the trading card optical compact disc of the present invention advantageously allows a user thereof to readily position the disc into a conventional disc reader with any separate special attachments, adapters, or fasteners. The positioning of and construction of the trading card interface seating means also enables the disc to balance and rotate effectively within a conventional disc reader. By not requiring a separate adapter, the trading card optical compact disc advantageously can be easier to use and, is some embodiments, easier and less expensive to manufacture.

A method of using a trading card optical compact disc to communicate digitally encoded data to a user of an optical disc reader is also provided according to the present invention. The method preferably includes positioning a trading card optical compact disc having an opening extending through a medial portion thereof onto a loading tray of a disc reader so that the compact disc interfacingly seats onto only portions of a seating ring and not other portions of the seating ring of the disc reader.

Additionally, methods of forming a trading card optical compact disc are provided according to the present invention. A method preferably includes molding at least a first plastic rectangular layer having a width of about 2.5 inches and a length of about 3.5 inches and having a pattern of digital data encoded thereon. The at least a first plastic layer preferably includes a major elevational portion having a first predetermined height and a minor elevational portion having a second predetermined height. The major elevational portion has the encoded digital data thereon and the minor elevational portion is devoid of the encoded digital data.

Another method of forming a trading card optical disc preferably includes positioning a compact disc having a pattern of digital data encoded thereon onto a medial portion of a surface of a trading card having a width of about 2.5 inches and a length of about 3.5 inches, the combination of the compact disc and the trading card having a major elevational portion and a minor elevational portion so that the major elevational portion interfacingly seats the combination onto a loading tray of a disc reader so as to interface with only portions of the seating ring and not other portions of the seating ring of the disc reader and to read digital data stored thereon from the trading card optical compact disc. The major elevational portion has the encoded digital data thereon, and the minor elevational portion is preferably devoid of the encoded digital data. The major elevational portion has first and second pairs of spaced-apart outer side peripheries defining outer boundaries of the major elevational portion. Each of the first pair of space-apart outer side peripheries arcuately extends between each of the second pair of space-apart outer side peripheries. Each of the second pair of space-apart outer side peripheries extends generally linearly between each of the first pair of spaced-apart outer peripheries.

Because the trading card optical compact disc and associated methods were conceived and developed while keeping in mind the commercial viability and ease of manufacturing, the trading card optical compact disc is preferably formed using conventional compact disc manufacturing techniques. This, for example, advantageously allows training, tooling, and other associated manufacturing costs to be reduced and advantageously provides incentives for manufacturers to more readily accept the technology for manufacturing purposes. In contrast to other known concepts, by providing incentives to make this technology readily manufacturable by existing compact disc manufacturers, the present invention achieves a significant goal in reducing the overall price of the end product to ultimate purchasers.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is a perspective view of trading card optical compact disc according to the present invention;

FIG. 2A is a bottom plan view of a trading card optical compact disc according to a first embodiment of the present invention;

FIG. 2B is a bottom plan view of a trading card optical compact disc according to a second embodiment of the present invention;

FIG. 3 is a side elevational view of a trading card optical compact disc according to a first embodiment of the present invention;

FIG. 4 is a vertical sectional view of a trading card optical compact disc according to taken along line 4—4 for FIG. 2A according to a first embodiment of the present invention;

FIG. 5 is a vertical sectional view of a trading card optical compact disc taken along line 5—5 of FIG. 2B according to a second embodiment of the present invention;

FIG. 6 is a perspective view of a trading card optical compact disc according to the third embodiment of the present invention;

FIG. 7 is a bottom plan view of a trading card optical compact disc according to the third embodiment of the present invention;

FIG. 8 is a vertical sectional view of a trading card optical compact disc taken along the line 8—8 of FIG. 7 according to the third embodiment of the invention;

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 9:
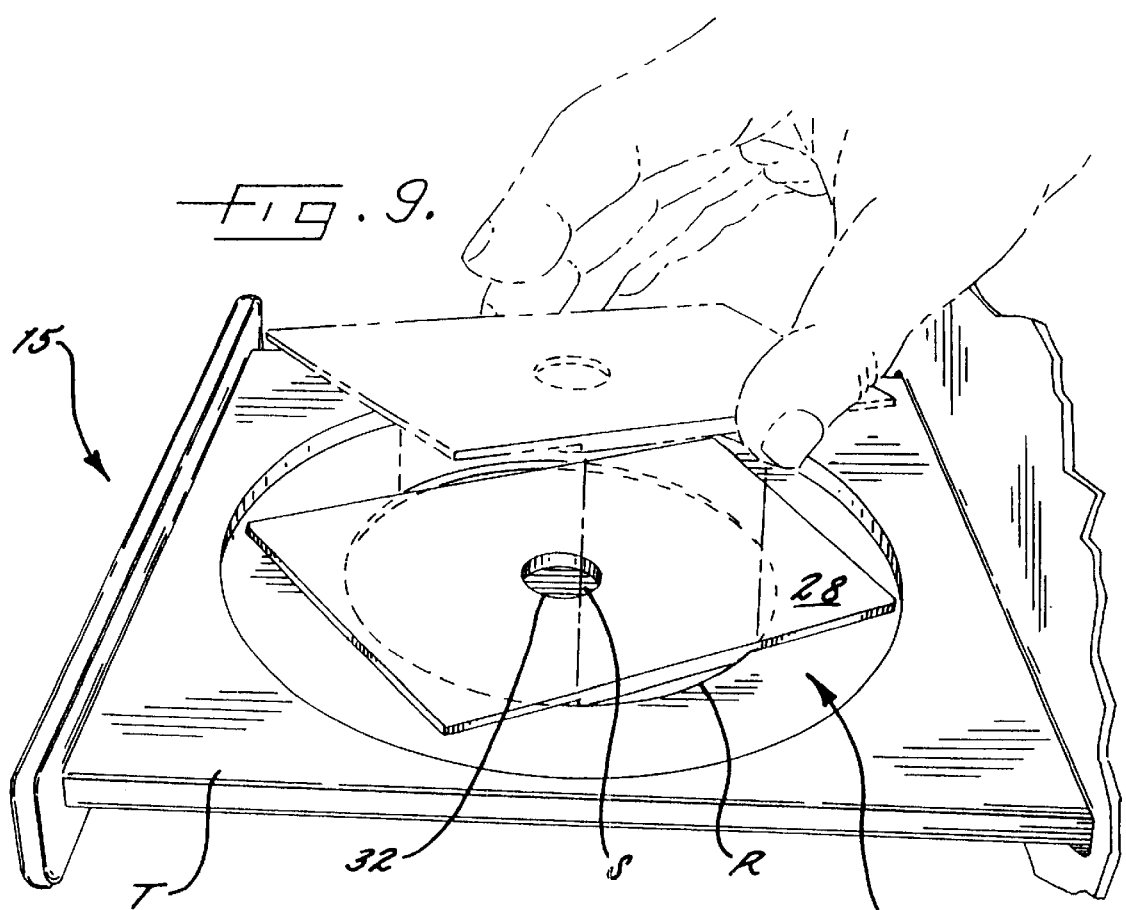
FIG. 9 is a perspective view of a trading card optical compact disc being positioned into a disc reader according to a first embodiment of the present invention.
Figure 10:
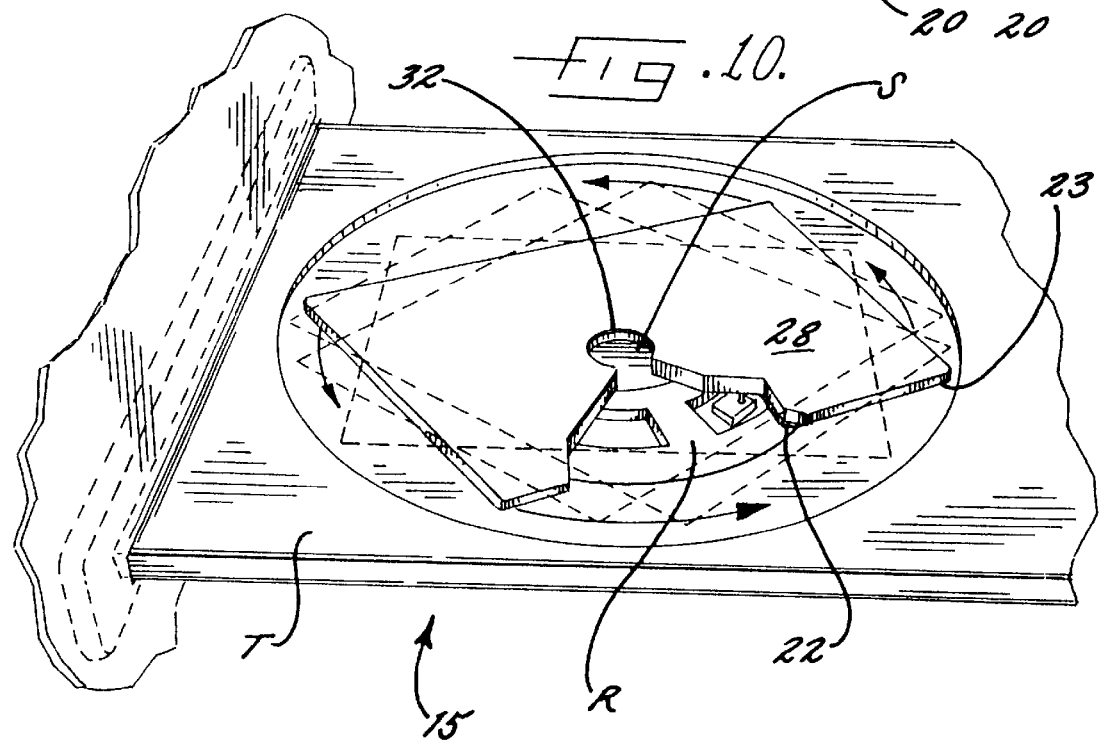
FIG. 10 is a fragmentary perspective view of a trading card optical disc positioned in a disc reader and being rotated for reading digital data therefrom.

FIG. 1 illustrates a perspective view of a trading card optical compact disc 20 according to an embodiment of the present invention. The trading card optical compact disc 20 is preferably compatible with a disc reader 15 (see FIGS. 9–10) which includes a centrally located spindle S and a seating ring R of a loading tray T for supporting and rotating a compact disc ("CD") positioned thereon. The trading card optical compact disc 20 has at least a first plastic rectangular layer 21 having a width of about 2.5 inches and a length of about 3.5 inches and having a pattern of digital data encoded thereon, i.e., pits and tracks as understood by those skilled in the art. The plastic of the first layer 21 is preferably a polycarbonate material or other optically transparent embossable plastic material as understood by those skilled in the art.

Various formats or data categories, including compact disc audio data, digital video disc ("DVD"), and/or compact disc read-only-memory ("ROM") data can be embossed into and stored on the first layer 21 by techniques known to those skilled in the art. For trading card applications (see FIG. 1), for example, digital data including visual information of photographs, video, textual information such as a person's or team's statistics and biographies, historical information, music, narration, and other data can be stored and recalled at will be a user of a disc reader 15. As understood by those skilled in the art, these trading card applications, for example, can include sports, music, entertainment, publishing, book, magazine, topical information, or various other types and formats of trading cards.

A conventional compact disc reader 15, for example, can include a loading tray T having a centrally located spindle S and a seating ring R for supporting and rotating a compact disc having planar upper and lower surfaces and embedded data tracks consisting of the encoded digital data. A compact disc reader 15 also has a digital data reading system which includes a source of light positioned for generating a light beam to illuminate the data tracks. A light beam is reflected from the data tracks and is modulated by the encoded digital data. A digital reading system of the compact disc reader 15 receives and converts a corresponding electrical signal for processing the read data, e.g., by a microprocessor-based decoding system.

Preferably, as illustrated in FIGS. 2A–2B, 3–5 and 8, a second metallic layer 24 is formed on at least portions of the first plastic layer 21, e.g., portions of or the entire major elevational portion 22 of the first plastic layer (see FIGS. 2A and 4). The metallic layer 24 preferably includes an aluminum material, such as conventionally used with forming optical compact discs, silver material, gold material, or other reflective metal material. The second layer 24 preferably provides a reflective surface for the light beam after it passes through the first optically transparent plastic layer 21 when attempting to read the digitally encoded data from the disc 20. As illustrated in FIGS. 2B and 5, for ease of manufacturing and aesthetic purposes, a second embodiment of the trading card 20' illustrates that the second layer 24' can also extend substantially the full length and width of the trading card optical compact disc 20'. The second embodiment also includes a first layer 21', a major elevational portion 22', the second layer 24', a third layer 26', a fourthe indicia berating layer 28', and a medial opening 32' extending therethrough (see also opening 32" of FIG. 8) as illustrated. In either the first or second embodiments of the trading card optical compact disc 20, 20', however, a non-metallic zone (see also indicia 29" of FIG. 6) is preferably formed around the entire peripheries of the trading card optical compact disc 20, 20'.

Additionally, a third protective layer 26 is preferably formed on at least the second layer 24 for protecting the metallic layer 24 such as from chipping, flaking, or other damage. The third layer 26 is preferably a lacquer material or other thin hard coat material which is formed on the first and second layers 21, 24 to enhance the scratch resistance and provide other protection for these layers 21, 24. A fourth indicia bearing layer 28 is preferably formed on the third layer 26 and has a generally planar upper surface for displaying indicia 29 therefrom. The indicia 29 is preferably a photograph, sketch, textual information, or other images formed by ink or other material formed or positioned onto either the lacquer layer or formed by another material, e.g., paper or plastic, formed on or adhered to the lacquer layer 26. Also, for example, if the indicia bearing layer is a paper material adhered to the lacquer layer 26, then an adhesive is preferably positioned therebetween. The thickness of the combination of the first, second, third, and fourth layers 21, 24, 26, 28 of the first and second embodiments is preferably less than about 0.06 inches or 1.5 mm.

As best shown in FIGS. 6–8, the thickness of the combination of the first, second, third, and fourth layers 21", 24", 26", 28" of the third embodiment of a trading card optical compact disc 20", e.g., a DVD format, which preferably uses a digital video data format is also preferably less than about 0.06 inches or 1.5 mm. This embodiment, as understood by those skilled in the art, preferably has at least two plastic layers 21a", 21b" each which are less than 0.03 inches or 0.75 inches or which form a composite layer as illustrated in the other embodiments. These two plastic layers 21a", 21b", however, are also preferably positioned prior to the metallic layer or second layer 24". These plastic layers 21a", 21b" are preferably used for data encoding, focusing, and image enhancement, especially in the DVD format as understood by those skilled in the art, have smaller pits, and form two levels of digitally encoded data.

An opening 32 preferably extends through the first, second, third, and fourth layers 21, 24, 26, 28 in a medial portion thereof (see FIGS. 1–2B and 6–7). The trading card optical compact disc 20 preferably has a perforated opening cover 33 which preferably attaches along perforation lines to either the third or fourth layers 26, 28. The opening cover 33 is preferably packaged and shipped with the trading card optical compact disc 20 so that the purchaser or user of the card can detach or remove the opening cover 33 from the card 20 for positioning the card 20 onto the spindle S of a disc reader 15. The opening 32 preferably has a diameter of about 0.6 inches, i.e., about 15 mm, and is primarily used to mount the card 20 onto the spindle S of a disc reader 15.

As illustrated in FIGS. 2A–2B, 3–5, and 7–8, a trading card optical compact disc 20 of the present invention also preferably has trading card interface seating means 40, e.g., preferably provided by a trading card interface seat, integrally formed in at least the first layer 21 for seating the trading card 20 onto a loading tray T of a disc reader 15 so as to interface with only portions of the seating ring R and not other portions of the seating ring R of the disc reader 15 and to read digital data stored thereon from the trading card optical compact disc 20. The trading card seating means 40 preferably includes at least the first plastic layer having a major elevational portion 22 having a first predetermined height and a minor elevational portion 23 having a second predetermined height. The first predetermined height preferably is about 0.05 inches. The major elevational portion 22 has the encoded digital data thereon, and the minor elevational portion 23 is preferably devoid of the encoded digital data. By the provision of the trading card interface seating means 40, the trading card optical compact disc 20 therefore advantageously does not require a separate special adapter for compatibility with existing disc readers. The positioning of and construction of the trading card interface seating means 40 also enables the disc 20 to balance and rotate effectively within a conventional disc reader 15.

The major elevational portion 22 is formed in a medial portion of the trading card 20 and has first and second pairs of spaced-apart outer side peripheries defining outer boundaries of the major elevational portion 22. Each of the first pair of space-apart outer side peripheries arcuately extend between each of the second pair of space-apart outer side peripheries. Each of the second pair of space-apart outer side peripheries extend generally linearly between each of the first pair of spaced-apart outer peripheries. Each of the arcuately-extending first pair of spaced-apart outer side peripheries of the major elevational portion 22 are centered about an axis A extending through the medial opening 32 and generally perpendicular to the linearly-extending second pair of space-apart outer side peripheries 38 (see also 38' of FIG. 2B and 38" of FIG. 7). A radius extending from a medial portion of the medial opening 32 to each of the arcuately-extending first pair of spaced-apart outer side peripheries of the major elevational portion 22 is less than 1.6 inches.

As perhaps best illustrated in FIG. 2A, the encoded digital data of the major elevational portion 22 of the first layer 21 is formed within a circular data zone 34 (see also 34' of FIGS. 2B and 5 and 34" of FIG. 7) and preferably does not cover, i.e., is less than, the entire surface area of the major elevational portion 22 of the first layer 21. The circular data zone 34 has a first inner circular periphery having a radius of at least 0.6 inches and a second outer circular periphery having a radius of less than 1.25 inches. The circular data zone 34 is preferably capable of storing between 60–70 Megabytes of digital information or digital data therein in some formats, e.g., audio or CD-ROM and capable of storing between 450–500 Megabytes of digital information in other formats, e.g., DVD. A first nonmetallic zone 36 (see also 36' of FIGS. 2B and 5 and 36" of FIG. 7) surrounds and extends outwardly a predetermined distance from the medial opening 32. A second non-metallic zone 38 extends inwardly from the rectangular outer perimeter of the trading card optical compact disc 20 a predetermined distance. The first non-metallic zone 36 preferably includes a stacking ring 37 (see also 37' of FIGS. 2B and 5 and 37" of FIG. 7) surrounding the opening 32 for stacking another optical compact disc thereon such as used during mass production. It will be understood by those skilled in the art, however, that the stacking ring 37 is not necessary in the construction of the trading card optical compact disc 20 according to the present invention.

As illustrated in FIGS. 1–10, the present invention also advantageously provides methods of using and methods of forming a trading card optical compact disc 20 according to the present invention. As perhaps best illustrated in FIG. 9, a method of using a trading card optical compact disc 20 to communicate digitally encoded data to a user of a disc reader 15 preferably includes positioning a trading card optical compact disc 20 having an opening 32 extending through a medial portion thereof onto a spindle S of a disc reader 15. The compact disc 20 preferably interfacingly seats onto only portions of a seating ring R and not other portions of the seating ring R of the disc reader 15. The trading card optical compact disc 20 can also be rotated so as to read digitally encoded data therefrom (see, e.g., FIG. 10).

A method of forming a trading card optical compact disc 20 according to the present invention preferably includes molding at least one plastic rectangular layer 21 having a width of about 2.5 inches and a length of about 3.5 inches and having a pattern of digital data encoded thereon. Prior to this molding step, however, and as understood by those skilled in the art, data for the disc 20 is optically, e.g., preferably by laser techniques, mastered from data files or other software programs. The master is then electroplated with a metal material, e.g., silver, and prepped for replicating positive mold copies or shims. Die stampers are produced from the electroplated shims. The plastic layer 21 is then formed by injection molding from a negative image on a die stamper. Alternatively, as understood by those skilled in the art, two plastic layers 21a", 21b" can be formed as illustrated in FIG. 8 for DVD formats. The plastic layer 21 preferably includes a major elevational portion 22 having a first predetermined height and a minor elevational portion 23 having a second predetermined height. The major elevational portion 22 preferably has the encoded digital data thereon, and the minor elevational portion 23 is preferably devoid of the encoded digital data. These major and minor elevational portions 21, 24 and the digitally encoded data are preferably formatted and implemented in the optical mastering step.

The major elevational portion 22 is preferably formed in a medial portion of the trading card optical compact disc 20 and has first and second pairs of spaced-apart outer side peripheries defining outer boundaries of the major elevational portion 22. Each of the first pair of space-apart outer side peripheries arcuately extend between each of the second pair of space-apart outer side peripheries. Each of the second pair of space-apart outer side peripheries extending generally linearly between each of the first pair of spaced-apart outer peripheries. The encoded digital data of the major elevational portion 22 of the plastic layer 21 is preferably formed within a circular data zone 34 and comprises less than the entire surface area of the major elevational portion 22 of the plastic layer 21. The molding of the plastic layer 21 preferably includes molding an opening 34 extending through a medial portion of the plastic layer 21.

The method can also include applying a metallic layer 24 on at least portions of the plastic layer 21 and applying a third protective layer 26 on at least the metallic layer 24 for particularly protecting the metal material of the metallic layer 24. The metallic layer 24, for example, can be applied by metalizing the plastic layer 21 through a high speed spinning process or other metalizing processes known to those skilled in the art. The third layer 26 is preferably applied by pouring or spraying a curable liquid onto the second layer 24 in a controlled manner. The method can further include applying an indicia bearing layer 28 on the third layer 26. The indicia bearing layer 28 preferably has a generally planar upper surface for displaying indicia 29 therefrom. The formed disc 20 can then be packaged in a clam shell package, a custom package, or other compact disc package as understood by those skilled in the art. The present invention thereby advantageously provides a trading card optical compact disc 20 and method of forming a trading card that stores and communicates trading card information to a user of a disc reader 15 in a manner that is relatively easy to manufacture in conjunction with known optical compact disc manufacturing techniques, e.g., an in-line production process, and thereby does not require extensive additional molding and tooling costs.

A method of forming a trading card optical compact disc 20 according to another embodiment of the present invention includes positioning a compact disc having a pattern of digital data encoded thereon onto a medial portion of a surface of a trading card having a width of about 2.5 inches and a length of about 3.5 inches. The combination of the compact disc and the trading card preferably have a major elevational portion and a minor elevational portion so that the major elevational portion interfacingly seats the combination onto a loading tray T of a disc reader 15 so as to interface with only portions of the seating ring R and not other portions of the seating ring R of the disc reader 15 and to read digital data stored thereon from the trading card optical compact disc 20. The major elevational portion 22 has the encoded digital data thereon and the minor elevational portion 23 is preferably devoid of the encoded digital data. The major elevational portion 22 has first and second pairs of spaced-apart outer side peripheries defining outer boundaries of the major elevational portion 22. Each of the first pair of space-apart outer side peripheries arcuately extends between each of the second pair of space-apart outer side peripheries. Each of the second pair of space-apart outer side peripheries extends generally linearly between each of the first pair of spaced-apart outer peripheries. The major elevational portion 22 is formed in a medial portion of the trading card 20 and has first and second pairs of spaced-apart outer side peripheries defining outer boundaries of the major elevational portion 20. Each of the first pair of space-apart outer side peripheries arcuately extending from each of the second pair of space-apart outer side peripheries. Also, each of the second pair of space-apart outer side peripheries extending generally linearly from each of the first pair of spaced-apart outer peripheries. The combination preferably includes an opening 32 formed in a medial portion thereof. Each of the arcuately-extending first pair of spaced-apart outer side peripheries of the major elevational portion are centered about an axis extending through the medial opening 32 and generally perpendicular to the linearly-extending second pair of space-apart outer side peripheries. A radius extending from a medial portion of the medial opening to each of the arcuately-extending first pair of spaced-apart outer side peripheries of the major elevational portion is less than 1.6 inches.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A card optical compact disc compatible with a disc reader which includes a loading tray having an inner annular-shaped recess positioned in an outer annular-shaped recess so that the inner annular-shaped recess defines an inner optical compact disc seating ring for supporting the card optical compact disc when positioned thereon, the card optical compact disc comprising:

at least a first layer having a pattern of digital data encoded thereon;

at least a second indicia bearing layer overlying the first layer, having a substantially planar and substantially rectangular-shaped upper surface for displaying indicia therefrom, and having portions thereof extending outwardly beyond the peripheries a the inner annular-shaped recess when the card optical compact disc is positioned in the disc reader; and card interface seating means associated with at least the first layer of the card optical compact disc for seating the card onto the loading tray of the disc reader so as to interfacingly abut with only portions of a periphery of the inner optical compact disc seating ring of the disc reader and not the entire periphery of the inner optical compact disc seating ring.

2. A card optical compact disc compatible with a disc reader which includes a loading tray having an inner annular-shaped recess positioned in an outer annular-shaped recess so that the inner annular-shaped recess defines an inner optical compact disc seating ring for supporting Zth card optical compact disc when positioned thereon, the card optical compact disc comprising:

at least a first layer having a pattern of digital data encoded thereon;

at least a second layer overlying the first layer, having a substantially planar and substantially rectangular upper surface, and having portions thereof extending outwardly beyond the peripheries of the inner annular-shaed recess when the card optical compact disc is positioned in the disc reader; and card interface seating means associated with the first layer of the card optical compact disc for seating the card onto the loading tray of the disc reader so as to abuttingly interface with only portions of a periphery of the inner optical compact disc seating ring and not the entire periphery of the inner optical compact disc seating ring of the disc reader.

3. A card optical compact disc as defined in claim 2, wherein the card nterface seating means further has at least two substantially arcuate and spaced-apart outer peripheries.

4. A card optical compact disc as defined in claim 3, wherein the card interface seating means further has at least two substantially linear extending outer peripheries extending between the arcuate outer peripheries, the linear outer peripheries not abuttingly interfacing with, and being secant to, the periphery of the seating ring.

5. A card optical compact disc comprising:

at least two layers of material having an opening extending through a medial portion thereof, at leat one of the two layers having an outer periphery with a substantially rectangular shape; and card interface seating means associated with at least one layer of material of the card optical compact disc for seating the card onto a loading tray of a disc reader so as to abuttingly interface with only portions of a periphery, and not the entire periphery, of an inner annular-shaped recess in the loading tray, the loading tray having the inner annular-shaped recess positioned in an outer annular-shaped recess so that the inner annular-shaped recess defines an inner compact disc seating ring and wherein portions of the substantially rectangular-shaped outer periphery extend beyond the an outer periphery of the inner compact disc seating ring when the card optical compact disc is positioned in the loading tray.

6. A method of using a card optical compact disc having an periphery with a substantially rectangular shp to communicate digitally encoded data to a user of an optical disc reader, the method comprising positioning the card optical compact disc having an opening extending through a medial portion thereof onto a loading tray of a disc reader so that the compact disc when positioned in an inner annular-shaped recess of the loading tray abuts only portions of a periphery of the inner annular-shaped recess, and not the entire periphery, of the inner annular-shaped recess, the loading tray having the inner annular-shaped recess positioned in an outer annular-shaped recess so that the inner annular-shaped recess defines an inner optical compact disc seating ring positioned adjacent the disc reader and wherein portions of the substantially rectangular shaped outer peripheries of the card optical compact disc extend beyond the outer periphery of the inner optical compact disc seating ring when the card optical compact disc is positioned in the loading tray, and rotating the card optical compact disc so as to read the digitally encoded data therefrom.

7. A card optical compact disc compatible with a disc reader which includes a loading tray having an inner annular-shaped recess positioned in an outer annular-shaped recess so that the inner annular-shaped recess defines an inner optical compact disc seating ring for supporting the card optical compact disc when positioned thereon, the card optical compact disc comprising:

at least a first layer having a pattern of digital data encoded thereon;

at least a second layer overlying the first layer, having a substantially planar and substantially rectangular upper surface, and having portions thereof extending outwardly beyond the periphery of the inner annular-shaped recessed when positioned in the disc reader; and a card interface seat associated with the first layer of the card optical compact disc to seat the card onto the loading tray of the disc reader when positioned therein so as to abuttingly interface with only portions of a periphery of the inner optical compact disc seating ring, and not the entire periphery, of the inner optical compact disc seating ring of the disc reader.

8. A card optical compact disc as defined in claim 7, wherein the card interface seat has at least two substantially arcuate and spaced-apart outer periphery portions.

9. An optical compact disc interface seat compatible with a disc reader which includes a loading tray having an inner annular-shaped recess positioned in an outer annular-shaped recess so that the inner annular-shaped recess defines an inner optical compact disc seating ring for supporting the optical compact disc interface seat when positioned thereon, the optical compact disc interface seat comprising:

at least a first layer having a pattern of digital data encoded thereon; and at least a second layer overlying the first layer and having a substantially planar upper surface, wherein an outer periphery of the layer thereof has at least two substantially arcuate and spaced-apart outer periphery portions and at least two substantially linear extending outer periphery portions connected to the arcuate outer perphery portions, the linear outer periphery portions not abuttingly interfacing with, and being secant to, the periphery of the seating ring when positioned therein.

10. An optical compact disc interface seat as defined in claim 8, wherein the second layer is an indicia bearing layer.

11. A card optical compact disc adapted to be used with a disc reader which includes a loading tray having an inner annular-shaped recess positioned in an outer annular-shaped recess so that the inner annular-shaped recess defines an inner optical compact disc seating ring for supporting the card optical compact disc when positioned thereon, the card optical compact disc comprising:

at least a first layer having a pattern of digital data encoded thereon;

at least a second layer overlying the first layer and having a substantially planar upper surface; and a card interface seat associated with the first layer of the card optical compact disc to seat the card onto the loading tray of the disc reader when positioned therein so as to abuttingly interface with only portions of the periphery of the inner optical compact disc seating ring, and not the entire periphery, the inner optical compact disc seating ring of the disc reader.

12. A method of using a card optical compact disc to communicate digitally encoded data to a user of an optical disc reader, the method comprising positioning the card optical compact disc having an opening extending through a medial portion thereof onto a loading tray of the disc reader, the card optical compact disc having a card interface seat having a first pair of spaced-apart and substantially parallel linear outer periphery portions and a second pair of spaced-apart and substantially arcuate outer periphery portions each connected to and extending between the first pair of outer periphery portions and rotating the card optical compact disc so to read digitally encoded data therefrom.

13. An optical compact disc interface seat comprising:

at least a first layer having a pattern of digital data encoded thereon; and at least a second layer overlying the first layer and having a substantially planar upper surface, and wherein an outer periphery of the first layer thereof has a pair of substantially arcuate and spaced-apart outer periphery portions and a pair of substantially linear extending outer periphery portions each connected to and extending between the substantially arcuate outer periphery portions, the pair of substantially linear periphery portions also extending substantially parallel to each other.

14. An optical compact disc interface seat as defined in claim 13, wherein the second layer is an indicia bearing layer.

15. A card optical compact disc comprising:

at least a first layer having a pattern of digital data encoded thereon;

at least a second layer overlying the first layer and having a substantially planar upper surface;

an opening extending through a medial portion of the first and second layers; and a card interface seat associated with the first layer of the card optical compact disc to seat the card onto a loading tray of a disc reader when positioned therein, the card interface seat having a first pair of spaced-apart and substantially parallel and generally linearly-extending outer periphery prtion and a second pair of spaced-apart and arcuately-extending outer periphery portions each connected to and extending between the first pair of outer periphery portions.

16. A card optical compact disc as defined in claim 15, wherein a radius extending from a center point of the opening to each of the arcuately-extending second pair of spaced-apart outer periphery portions is less than 1.6 inches.

* * * * *

UNITED STATES PATENT AND TRADEMARK OFFICE
CERTIFICATE OF CORRECTION

PATENT NO. : 6,304,544 B1
DATED : October 16, 2001
INVENTOR(S) : Pierson et al.

It is certified that error appears in the above-identified patent and that said Letters Patent is hereby corrected as shown below:

Title page,
ABSTRACT, line 20, please delete "ring of the seating ring" and insert -- ring and not other portion of the seating ring -- therefor.

Column 1,
Lines 30-31, please delete " "Tape Recording Apparatus And System Having A Very Thin Cassette," " and insert -- *"Tape Recording Apparatus And System Having A Very Thin Cassette,"* -- therefor.

Line 31, please delete "Dual-Function Information-Carrying Sheet Device," " and insert -- *"Dual-Function Information-Carrying Sheet Device,"* -- therefor.

Column 2,
Lines 6-7, please delete " "Optically Readable Thin Film Digital Data Storage Medium." " and insert -- *"Optically Readable Thin Film Digital Data Storage Medium."* -- therefor.
Line 40, please delete "if" and insert -- is -- therefor.
Line 66, please delete "space-apart" and insert -- spaced-apart -- therefor.

Column 3,
Lines 2 and 8, please delete "space-apart" and insert -- spaced-apart -- therefor.
Line 34, please delete "is" and insert -- in -- therefor.

Column 4,
Lines 6, 8 and 9, please delete "space-apart" and insert -- spaced-apart -- therefor.
Line 34, between "of" and "trading", please insert -- a --.
Line 46, please delete "according to".
Line 46, please delete for and insert -- of -- therefor.
Line 59, between "along" and "line", please delete "the".

Column 5,
Line 39, please delete "be" and insert -- by -- therefor.

Column 7,
Lines 24, 25, 26 and 33, please delete "space-apart" and insert -- spaced-apart -- therefor.

Column 8,
Lines 41, 43 and 44, please delete "space-apart" and insert -- spaced-apart -- therefor.

UNITED STATES PATENT AND TRADEMARK OFFICE
CERTIFICATE OF CORRECTION

PATENT NO. : 6,304,544 B1
DATED : October 16, 2001
INVENTOR(S) : Pierson et al.

It is certified that error appears in the above-identified patent and that said Letters Patent is hereby corrected as shown below:

Column 9,
Lines 29, 30, 31, 37, 39, 40 and 48, please delete "space-apart" and insert -- spaced-apart -- therefor.

Column 10,
Line 7, between "peripheries" and "the", please delete "a" and insert -- of -- therefor.
Line 21, please delete "Zth" and insert -- the -- therefor.
Line 30, please delete "shaed" and insert -- shaped -- therefor.
Line 40, please delete "nterface" and insert -- interface -- therefor.
Line 50, please delete "leat" and insert -- least -- therefor.
Line 64, before "outer", please delete "an".

Column 11,
Line 2, between "an" and "periphery", please insert -- outer --.
Line 2, please delete "shp" and insert -- shape -- therefor.
Line 34, please delete "recessed" and insert -- recess -- therefor.
Line 60, please delete "perphery" and insert -- periphery -- therefor.

Column 12,
Line 15, please delete "periphery, the" and insert -- periphery of the -- therefor.
Line 58, please delete "prtion" and insert -- portions -- therefor.

Signed and Sealed this

Twenty-eighth Day of May, 2002

*Attest:*

*Attesting Officer*

JAMES E. ROGAN
*Director of the United States Patent and Trademark Office*